Nov. 16, 1943.   P. MANTEROS   2,334,342
ROTARY CUTTER
Filed March 13, 1942
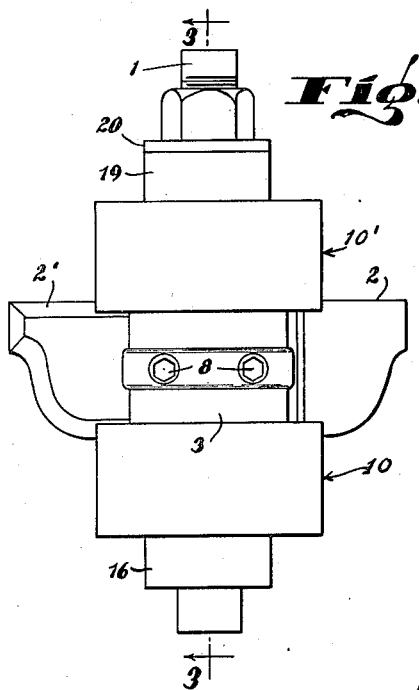
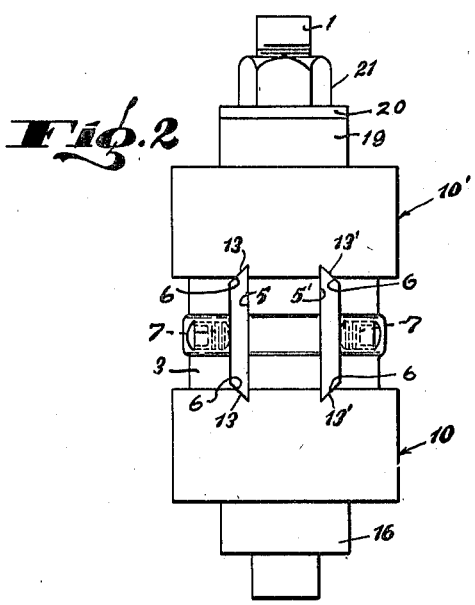
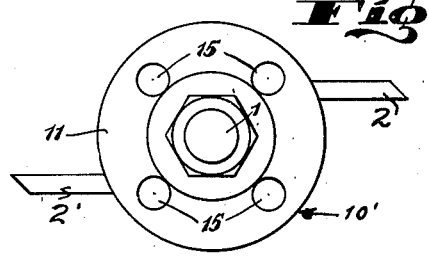
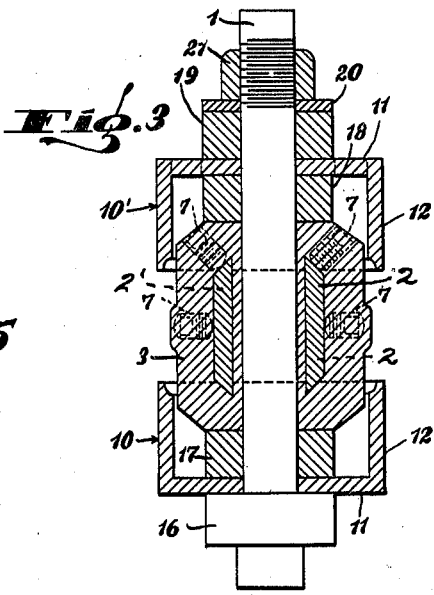
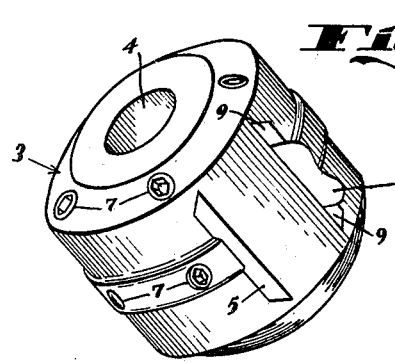
Inventor
Paul Manteros
By John E. R. Hayes
Attorney Patented Nov. 16, 1943

2,334,342

UNITED STATES PATENT OFFICE 2,334,342

ROTARY CUTTER

Paul Manteros, Westerly, R. I.

Application March 13, 1942, Serial No. 434,495

2 Claims. (Cl. 144—231)

The invention relates to a rotary cutter for shaping wood and other materials, and which cutter is commonly referred to as a shaping cutter, and is rotated by the rotation of a spindle upon which the cutter is arranged.

Among the objects of the invention are:

To provide a cutter in which the integrity of the spindle will be maintained and bending thereof avoided, both during the fixing of the cutters, or cutting blades, and during their working.

To provide for a positive fixing of the cutters, or cutting blades; at the same time admitting of their easy removal, adjustment, or change of location, whether directed to right or left work, and this independent of the width of the blade; and To provide a tool applicable to all types of work, whether directed to the under side of the object worked upon, the upper side of the object, or along the edge between the two sides.

The invention can best be seen and understood by reference to the drawing in which an embodiment thereof is shown, in which—

Fig. 1 is a front elevation of the rotary cutter.

Fig. 2 is a side elevation of the rotary cutter with the cutting blades removed.

Fig. 3 is a cross vertical section of the rotary cutter.

Fig. 4 is a plan of the same; and

Fig. 5 is a perspective of the turret, later to be referred to.

Referring to the drawing—1 represents a spindle and 2, 2′ the cutting blades which are rotated as the spindle is rotated.

The cutting blades are borne by a turret 3 within which they are held, and it is this turret, bearing the blades, that is mounted upon the spindle and affixed thereto to rotate therewith.

The turret 3 presents a generally cylindrical stocky body with squared ends presenting a relatively broad bearing surface. Extending vertically through the center of the turret is an opening 4 by which the turret may be slipped onto the spindle. This opening is such as to provide an easy sliding fit. Cut through the turret are slots 5, 5′. It is these slots which receive the cutting blades. The slots are arranged on opposite sides of the opening 4 through the turret and are parallel with one another. The slots closely adjoin the opening 4, without cutting into the opening, for obtaining as long a slot as possible. Each slot is made sufficiently deep to receive the widest cutting blade that can be used in the machine. The top and bottom edges 6 of the slots are bevelled. The top and bottom edges of the blades are likewise bevelled. The blades are maintained in adjusted position on the turret by means of set screws 7 with which the turret is studded. Some of these screws are arranged to bear, when tightened, against the sides of the blades, and others of the set screws tighten against the bevelled top edges of the blades. All the set screws are preferably made adaptable to be turned by a wrench and accordingly each is inset with a socket 8 into which the end of a wrench may be inserted and the screw turned. The blades have any desired cutting configuration and may be of the widest width of which the slots permit, or they may be of lesser width, in which case fillers 9 are employed to fill the space between the top and bottom edges of each of the blades and the top and bottom edges of the slot within which the blade is contained, substantially as shown in Fig. 5; this in order that the bearing of the set screw 7 against the side of the blade may be at substantially the center of the blade.

The blade carrying turret is positioned between opposing sleeves 10, 10′. Each of these sleeves has an annular end piece 11 with opening in it through which the spindle extends. Projecting from its end piece 11 each of the sleeves is provided with a relatively deep rim forming flange 12. These flanges for the respective sleeves partially overlap the body of the turret; dependent upon the width of the blades and the location of the blades within the turret, for the sleeves are so located that their respective flanges facing each other will partially overlap the body of the turret to loosely meet the adjacent edges of the blades in order that the flanges may provide surface against which the work may have bearing when engaged by the blades. It is desirable that the edges to the flanges of the respective sleeves thus overlapping the body of the turret and loosely meeting the adjacent edges of the blades will, also, lap by the edges of the blades for a short distance. To this end sets of notches 13, 13′ are cut in the edges of the rim into which the edges of the blades loosely fit. These notches are right and left cut notches in order that the blades may be set in the turret for either clockwise or anticlockwise rotation. Thus as indicated in Fig. 2 where the combined parts are shown without the blades, if the rotation of the parts is to be in a clockwise direction then the blade 2 would be arranged in the slot 5′ on the one side of the turret with edge extension into the notches 13′ of the respective rims, and the blade 2′ would be arranged in the slot 5 on the reverse side of the turret with edge extension into the notches 13.

If the rotation is to be in an anti-clockwise direction then the positions of the blades would be reversely changed, that is each blade would be shifted to extend out of the turret on the side opposite to that for clockwise rotation. In this connection it will be understood that both the slots 5 and 5' extend through the turret.

In order that the edges to the rims of the respective sleeves may loosely meet the adjacent edges of the blades and, if notched, that the edges of the blades may fit loosely in the respective notches, spacing collars 17 and 18 are provided. These collars are arranged upon the spindle and interposed, respectively, between the ends of the turret and the end pieces of the respective sleeves, the collar 17 being interposed between the bottom of the turret and the end piece to the sleeve 10, and the collar 18 between the top end of the turret and the end piece to the sleeve 10'. The spacing collars are chosen from a number of like collars of different thickness and will be chosen of a thickness dependent upon the width of the blades in order that the rims of the sleeves may meet the edges of the blades and provide bearing surface for the work when engaged by the blades.

The combined parts which include the blade carrying turret, the opposing sleeves, and spacing members, are bound together and affixed to the spindle for purpose of rotation. This is accomplished without any exertion, or pressure, between the rims of the sleeves and the blades as follows:

The spindle is provided at a point removed from its free end with an annular collar 16. The sleeve 10 is first applied to the spindle and its end piece brought to bear against this collar. There is then applied to the spindle the spacing collar 17 of chosen thickness, after which the turret is applied to the spindle and its bottom end brought to bear against this spacing collar. There is then applied to the spindle a spacing collar 18 of chosen thickness and brought to bear against the top end of the turret. The sleeve 10' is then applied to the spindle and its end piece brought to bear against the spacing collar 18. After the application of the sleeve 10' to the spindle there is then applied to the spindle a collar 19 with bearing against the end piece to the sleeve 10'. Above the collar 19 is placed a lock washer 20 and then a nut, or nuts, 21 are placed on the threaded end of the spindle, and these, when tightened, will bind the assembled parts together and affix them to the spindle for purpose of rotation. With the parts thus bound together no strain will be brought upon the spindle by any bearing of the edges of the sleeves against the blades for the edges of the sleeves only loosely meet the edges of the blades, and have no such engagement therewith as will cause strain to be brought upon the spindle when the assembled parts are bound together.

The width and location of the blades and the relative overlap of the flanges on the sleeves with relation to the turret is such that at no time will the flanges overlap the turret so far as to cover the heads of the set screws which bear against the sides of the blades. The sleeve 10' is provided in its end piece with openings 15 through which access may be had to the set screws which bear against the bevelled edges of the blades, or fillers, for turning these screws without removing the sleeve. These openings bear proper relation to the notches 13, 13' in the edges of the rims of the respective sleeves that access may always be had through the openings 15 to the set screws irrespective of the setting of the blades.

With the parts thus assembled and fixed to the spindle the flanges 12 of the respective sleeves, 10, 10' will provide a broad facing against which the work may have bearing and along which the work may be moved during the operation of the blades. In such case the work, if of sufficient thickness, may simultaneously have bearing against both flanges, or it may have bearing against one flange or the other, depending upon the adjusted position of the parts with relation to the table above which the blades are rotating, and over which the work is fed; or dependent upon whether the cut is to be made from the under side of the work, or the upper side of the work, the assemblage being such as to provide for practically any type of cutting, and this irrespective of the width of the cutting blades, or their position on the turret.

When it is desired to change the location of the blades, or their position, or insert new blades, it is unnecessary to remove the whole assembly from the spindle unless the width of blade be changed. The nut 21 may first be loosened, or removed, when the assembled parts may be moved sufficiently to re-locate the blades or insert new blades, after which the assembled parts may again be bound together. If the newly inserted blades are of different width than those previously used, necessitating change in the thickness or depth of the spacing collars 17 and 18, then it will be necessary to remove such parts from the spindle as will enable the new set of spacing collars to be inserted, and these of a depth, or thickness, dependent upon the width of the new set of blades.

Inasmuch as the turret and cutters carried by it constitute a separate unit complete in itself the turret with contained cutters may be removed at any time and replaced by another turret to which cutters have already been affixed.

I claim:

1. In rotary cutters for shaping wood and other materials, the combination comprising a spindle, a blade bearing turret with opening in it through which the spindle extends, blades borne by the turret, means borne by the turret for affixing the blades to it, and mechanism for affixing the blade carrying turret to the spindle and provide surface against which the work may have bearing when engaged by the blades, said mechanism including opposing sleeves arranged upon the spindle and between which the turret is interposed, each of said sleeves comprising an end piece with opening in it through which the spindle extends and a rim forming flange extending from the end piece, the flanges of the respective sleeves facing each other and partially overlapping the body of the turret to loosely meet the adjacent edges of the blades, spacing collars arranged upon the spindle and interposed, respectively, between the inner surfaces of the end pieces to the sleeves and the adjacent ends of the turret, and means surrounding the spindle adaptable when tightened to bind together the turret, sleeves and spacing collars, and affix them to the spindle.

2. In rotary cutters for shaping wood and other materials, the combination comprising a spindle, a blade bearing turret with opening in it through which the spindle extends, blades borne by the turret, means borne by the turret for affixing the blades to it, and mechanism for affixing the turret to the spindle and provide surface against which the work may have bearing when engaged by the blades, said mechanism including a sleeve arranged upon the spindle, said sleeve comprising an end piece with opening in it through which the spindle extends and a rim forming flange extending from the end piece to partially overlap the body of the turret and loosely meet the adjacent edges of the blades, a spacing collar arranged upon the spindle and interposed between the inner surface of the end piece of the sleeve and the adjacent end of the turret, and means surrounding the spindle adaptable when tightened to bind together the turret, sleeve and spacing collar, and affix them to the spindle.

PAUL MANTEROS.